Nov. 24, 1925.

H. S. WALTER ET AL

MEASURING RULE

Filed May 29, 1925

1,562,933

Inventors
Henry S. Walter
Christian Bodmer

By N. Clay Lindsey.
Their Attorney

Patented Nov. 24, 1925.

1,562,933

UNITED STATES PATENT OFFICE.

HENRY S. WALTER AND CHRISTIAN BODMER, OF NEW BRITAIN, CONNECTICUT, ASSIGNORS TO THE STANLEY WORKS, OF NEW BRITAIN, CONNECTICUT, A CORPORATION OF CONNECTICUT.

MEASURING RULE.

Application filed May 29, 1925. Serial No. 33,785.

*To all whom it may concern:*

Be it known that we, HENRY S. WALTER and CHRISTIAN BODMER, citizens of the United States, and residents of New Britain, county of Hartford, State of Connecticut, have invented certain new and useful Improvements in Measuring Rules, of which the following is a specification.

The aim of the present invention is to provide a measuring rule with improved means for alining the end of the rule with the edge or end of the object to be measured.

More particularly, the object of the invention is to provide a device of the character described having various features of novelty and advantage, and which is particularly characterized by its extreme simplicity in construction, its economy of manufacture and its effectiveness of operation.

In the preferred embodiment of our invention, the rule is provided, adjacent one end, with a pivoted piece or hook preferably formed of sheet metal and so shaped and mounted that when in operative position, an edge of the piece is in alinement with the end edge of the rule; and when in operative position, the piece is spaced from the scale edge of the rule. The hook may be readily swung into and out of operative position. It is effectively held in each of these positions and when in inoperative position it does not obscure the scale marks of the rule or in any way interfere with the use of the rule as a measuring instrument.

Other objects will be, in part, obvious and, in part, pointed out hereinafter more in detail.

The invention consists in the features of construction, combinations of elements and arrangement of parts which will be exemplified in the construction hereinafter set forth, and the scope of the application of which will be indicated in the appended claims.

In the accompanying drawings, we have shown for illustrative purposes one of the embodiments which the invention may take.

Figure 4:
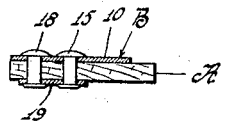
Fig. 4 is a sectional view taken substantially on line 4—4 of Fig. 1.

Referring to the drawings in detail, A denotes generally a measuring rule which, if desired, may consist of a plurality of sections pivotally connected together. B designates, generally, the hook. The hook B is preferably formed of sheet metal and has a body portion 10 from which extends a finger 11. The finger 11 has a straight edge 12 which, when the device is in operative position, is in alinement with the end edge 13 of the rule. The hook is secured for swinging movement to the rule by a stud or pivot pin 15 which may be in the form of a rivet, its opposite ends being headed over, as shown most clearly in Fig. 4.

For the purpose of limiting the extent of swinging movement of the hook in either direction, the body portion of the hook is provided with a concentric arcuate slot 17 in which engages a stop pin 18. This pin 18 may also be in the form of a rivet. To reinforce the structure and prevent the pins from being pulled through the rule, which is preferably of wood, there is provided on the rear side of the rule a face plate 19, through which the pins 15 and 18 extend.

Figure 1:
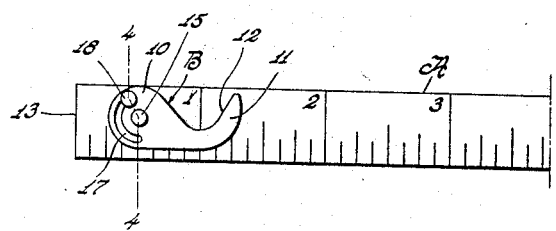
Fig. 1 is a side view of one end of a rule providing with our improved hook, the latter being shown in retracted or inoperative position.
Figure 2:
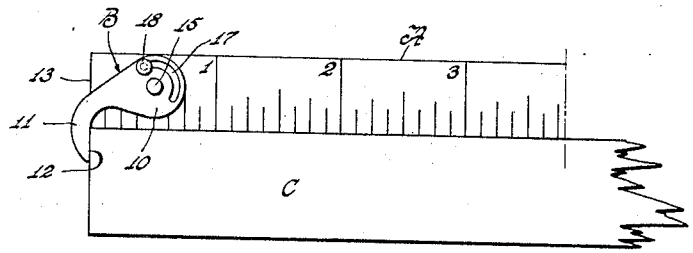
Fig. 2 is a view similar to Fig. 1, but showing the hook in operative position and engaging the object to be measured.
Figure 3:
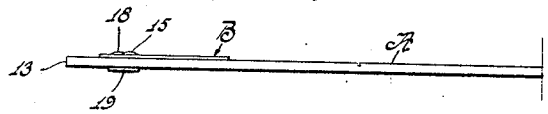
Fig. 3 is an edge view with the hook in inoperative position.

It will be seen from Fig. 2 that when the hook is in operative position, the straight edge 12 thereof is in alinement with the end edge 13 of the rule, so that when the edge 12 engages the end of an object such as is designated by the letter C, the end of the rule 13 is also in alinement with the end of this object. The arcuate slot 13 and the pin 18 are in such relation that the pin limits the swinging of the hook to a position where the edge 12 is in alinement with the end edge of the rule. When it is not desired to use the hook, it may be swung to the inoperative position shown in Fig. 1 and in which position the hook is spaced from the measuring or scale edge of the rule so that the hook does not obscure the scale or in any way interfere with the normal use of the rule; features which are of prime importance. The pin 18 prevents the hook B from being moved to such a position that it extends beyond the upper edge of the rule. Thus, when the hook is in inoperative position, it is always within the compass of the rule.

It will be seen from the foregoing description that our device comprises but relatively few parts, each of which is very simple in construction, so that they may be cheaply manufactured. These parts may be readily assembled together at a relatively low cost. The assembled construction is strong and durable and, in fact, will last as long as the rule itself. The hook may be very quickly swung from one position to the other. The construction is such that each time the hook is thrown into operative position, the straight edge 12 thereof will be in accurate alinement with the end edge of the rule.

We claim as our invention:

1. The combination with a measuring rule of a member pivoted to one side of said rule and having a finger provided with an edge in alinement with the end edge of said rule when said member is in operative position, said member having an arcuate slot, a pin pivotally connecting said member to said rule, and a pin carried by said rule and engaging in said slot for limiting the extent of pivotal movement of said member in each direction.

2. The combination with a measuring rule of a plate on one side of said rule, a pivotal member on the other side of said rule and having a finger provided with an edge in alinement with the end edge of said rule when said member is in operative position, a pin extending through said plate, rule and member and on which said member is pivoted, said member having an arcuate slot, and a stud extending through said plate and rule and engaging in said slot for limiting the pivotal movement of said member.

HENRY S. WALTER.
CHRISTIAN BODMER.